United States Patent [19]

Togami et al.

[11] Patent Number: 5,110,861
[45] Date of Patent: May 5, 1992

[54] SEALING RESIN COMPOSITION FOR ELECTRONIC COMPONENT AND ELECTRONIC COMPONENT

[75] Inventors: Masato Togami, Shizuoka; Toshio Kanoe, Osaka, both of Japan

[73] Assignee: Polyplastics Co., Ltd., Osaka, Japan

[21] Appl. No.: 386,275

[22] Filed: Jul. 28, 1989

[30] Foreign Application Priority Data

Aug. 4, 1988 [JP] Japan .................. 63-194746

[51] Int. Cl.⁵ .............. C08L 31/00; C08L 77/12; C08L 33/18; C08J 31/36
[52] U.S. Cl. ................ 524/601; 523/213; 524/602; 524/404; 524/432; 524/433; 524/588; 524/518
[58] Field of Search ............. 523/213; 524/601, 602, 524/404, 432, 433, 588

[56] References Cited

U.S. PATENT DOCUMENTS

| | | | |
|---|---|---|---|
| 4,626,371 | 12/1986 | Ikenaga et al. | 252/62.54 |
| 4,639,476 | 1/1987 | Tajiri et al. | 523/213 |
| 4,719,250 | 1/1988 | Eickman et al. | 523/212 |
| 4,851,497 | 7/1989 | Warui et al. | 524/601 |
| 4,861,515 | 8/1989 | Minamisawa et al. | 523/213 |

*Primary Examiner*—Thurman K. Page
*Assistant Examiner*—E. J. Webman
*Attorney, Agent, or Firm*—Burns, Doane, Swecker & Mathis

[57] ABSTRACT

A sealing resin composition is provided with is useful in the encapsulation of an electronic component and comprises a melt-processable polyester having a weight-average molecular weight of 1000 to 3900 and is capable of forming an optically anisotropic molten phase, and at most 80 percent by weight based upon the total weight of the composition of an inorganic powder which has been surface-treated with an epoxysilane or mercaptosilane coupling agent.

23 Claims, 1 Drawing Sheet

SEALING RESIN COMPOSITION FOR ELECTRONIC COMPONENT AND ELECTRONIC COMPONENT

The present invention relates to a sealing material for electronic components which comprise a polyester resin exhibiting optical anisotropy in its molten state. Particularly, it relates to a sealing resin composition for electronic components which is excellent in flow properties and humidity resistance.

PRIOR ART

The sealing of IC, transistor, diode, coil, capacitor, resistor, connector or LSI with a synthetic resin has been widely carried out with the purpose of keeping the insulation properties, protecting them from external force or inhibiting changes in the characteristics caused by the ambient atmosphere An anisotropic molten phase-forming, melt-processable polyester (hereinafter abbreviated to "liquid-crystal polyester") is extremely useful as a sealing material, because it has excellent properties such as low coefficient of linear expansion, low molding shrinkage, low modulus of elasticity and so on. However, a sealing material containing a liquid-crystal polyester having a higher molecular weight sometimes causes the deformation or breaking of gold wires of an element or damages the inner structure of a component under some injection conditions, owing to its poor flow properties and its shearing force caused by flowing.

Further, the liquid-crystal polyester-containing sealing material for electronic components according to the prior art tends to absorb moisture significantly, so that the component sealed therewith often causes the leakage of an electric current and corrosion of an element owing to the absorbed moisture These problems have recently become more significant as the structure of an element of an electronic component has become more complicated.

Since, as described above, a sealing material comprising a liquid-crystal polyester is not satisfactory as yet, the inventors of the present invention have diligently studied and have found that a sealing material excellent in flow properties and humidity resistance can be obtained by adding an inorganic powder surface-treated with a specific silane coupling agent to a low-molecular weight, liquid-crystal polyester having a weight-average molecular weight of 1000 to 3900. The present invention has been accomplished on the basis of this finding.

Figure 1A:
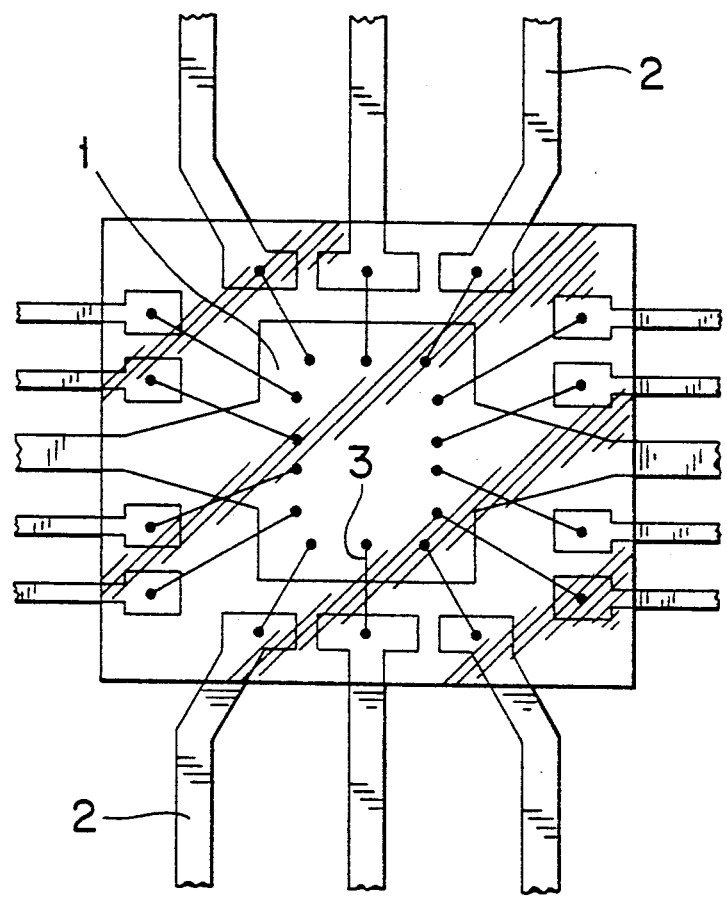
FIG. 1(a) is a schematic plan view of the sealed article prepared in the Examples and FIG. 1(b) is a typical view illustrating the examination of IC for sweep of a gold wire.

1 . . . chip, 2 . . . lead frame, 3 . . . gold wire, 3a . . . state of gold wire before molding, 3b . . . state of gold wire after molding.

SUMMARY OF THE INVENTION

Namely, the present invention provides a sealing resin composition for an electronic component comprising a melt-processable polyester which has a weight-average molecular weight of 1000 to 3900 and can form an anisotropic molten phase and at most 80% (based on the total amount of the composition) of an inorganic powder surface-treated with an epoxy-or mercapto-silane coupling agent.

The liquid-crystal polyester according to the present invention is melt processable and has a property that the molecular chains of the polymer are regularly arranged in parallel in a molten state Such an arrangement of molecules is also called "liquid-crystal state" or "nematic phase of a liquid-crystal substance". The molecule of such a polymer is generally slender and flat, exhibits a high stiffness along its major axis and generally contains a plurality of chain-lengthening linkages in a coaxial or parallel state.

The presence of an anisotropic molten phase can be ascertained by a conventional test with polarized light using crossed nicols. Precisely, a molten sample put on a Leitz hot stage is observed with the crossed nicols in a nitrogen atmosphere by the use of a Leitz polarization microscope (40×magnification). When polarized light can be transmitted through the nicols even when the sample is in a static molten state, the polymer is defined as an optically anisotropic, or liquid-crystal polymer.

The constituents of the above anisotropic molten phase-forming, melt-processable polymer are selected from among ① one or more of aromatic or alicyclic dicarboxylic acids, ② one or more of aromatic, alicyclic or aliphatic diols, ③ one or more of aromatic hydroxy carboxylic acids, ④ one or more of aromatic thiol carboxylic acids, ⑤ one or more of aromatic dithiols and aromatic thiol phenols, and ⑥ one or more of aromatic hydroxylamines and aromatic diamines.

The anisotropic molten phase-forming polymer according to the present invention includes I) polyesters made from components ① and ②,
II) polyesters made from components ③ alone,
III) polyesters made from components ①, ② and ③,
IV) polythiol ester made from component ④ alone,
V) polythiol ester made from components ① and ⑤,
VI) polythiol ester made from components ①, ③ and ⑤,
VII) polyester amide made from components ①, ③ and ⑥, and
VIII) polyester amide made from components ①, ②, ③ and ⑥. These polymers may further contain a mono- or di-functional compound for regulating the molecular weight as a constituent. Examples of the compound include aromatic mono- or dicarboxylic acids, esters thereof, aromatic diols and alcohols and esters thereof.

Further, the anisotropic molten phase-forming polymer according to the present invention also includes aromatic polyazomethine, though it does not fall under the above categories. Particular examples thereof include poly(nitrilo-2-methyl-1,4-phenylenenitriloethylidyne-1,4-phenyleneethylidyne), poly(nitrilo-2-methyl-1,4-phenylenenitrilomethylidyne -1,4-phenylenemethylidyne) and poly(nitrilo-2-chloro -1,4-phenylenenitrilomethylidyne-1,4-phenylenemethylidyne).

Furthermore, the anisotropic molten phase-forming polymer includes polyester carbonates, though they do not fall under the above categories. A representative polyester carbonate essentially comprises 4-oxybenzoyl, dioxyphenyl, dioxycarbonyl and terephthaloyl units.

The polyesters I), II) and III) and polyester amide (VII), which can be all preferably used in the present invention as an anisotropic molten phase-forming polymer, can be prepared according to various esterification methods from organic functional monomers which can be condensed with each other to form an objective repeating unit. Examples of the functional group include carboxyl, hydroxyl, ester, acyloxy, acyl halide and amino groups. The above organic functional monomers may be reacted by a so-called melt acidolysis method in the absence of any heat exchange fluid. According to this method, monomers are mixed and heated together to form a melt. As the reaction proceeds, solid polymer particles are generated in a state suspended in the melt. The reaction may be carried out in a vacuum in order to facilitate the removal of a volatile by-product (such as acetic acid or water) in the final step of the condensation.

Further, a slurry polymerization method may be employed in the preparation of the liquid-crystal polyester according to the present invention. According to this method, a solid product can be obtained in a state suspended in a heat exchange medium.

According to any of melt acidolysis and slurry polymerization, an organic monomer having a hydroxyl group for constituting a liquid-crystal polyester may be used in an esterified (modified) state (i.e., as a lower acyl ester). It is preferred that the lower acyl group have about 2 to 4 carbon atoms. It is still preferred to use such a monomer as its acetate.

Representative examples of the catalyst which can be used in both of melt acidolysis and slurry polymerization include dialkyltin oxides (e.g., dibutyltin oxide), diaryltin oxides, titanium dioxide, antimony trioxide, alkoxytitanium silicate, titanium alkoxide, carboxylates of alkyl metals and alkaline earth metals (e.g., zinc acetate), Lewis acids (such as $BF_3$) and gaseous acid catalysts such as hydrogen halides (e.g., HCl). The amount of the catalyst used is preferably about 0.001 to 1% by weight, still preferably about 0.01 to 0.2% by weight, based on the total weight of the monomers used.

The liquid-crystal polymer to be used in the present invention is substantially insoluble in any ordinary solvent, so that the solution processing thereof is difficult. As described above, however, the polymer can be easily processed by a conventional melt processing method. Particularly preferred liquid-crystal polymers are those slightly soluble in pentafluorophenol.

The liquid-crystal polyester to be used in the present invention must have a weight-average molecular weight of 1000 to 3900. When the weight-average molecular weight is less than 1000, the moldability of the resulting composition will be poor, while when it exceeds about 4000, the resulting composition will unfavorably cause the breakage and deformation of the substance to be sealed owing to its poor flow properties and its high shearing force caused by flowing. It is preferable that the weight-average molecular weight be about 2000 to 3700. The molecular weight can be determined by gel permeation chromatography or other standard methods not requiring the formation of a solution of a polymer. For example a polymer is compression-molded into a film to determine the amount of its terminal groups by infrared spectrophotometry. Alternatively, a polymer is dissolved in pentafluorophenol to determine the molecular weight by a light-scattering method.

The anisotropic molten phase-forming polyester to be used in the present invention is preferably an aromatic polyester or polyester amide, still preferably a polyester containing both an aromatic polyester moiety and an aromatic polyester amide moiety in one molecular chain.

Preferred examples of the compounds constituting them include naphthalene compounds such as 2,6-naphthalenedicarboxylic acid, 2,6-dihydroxynaphthalene, 1,4-dihydroxynaphthalene and 6-hydroxy-2-naphthoic acid; biphenyl compounds such as 4,4'-biphenyldicarboxylic acid and 4,4'-dihydroxybiphenyl; compounds represented by the following general formulas (I), (II) or (III):

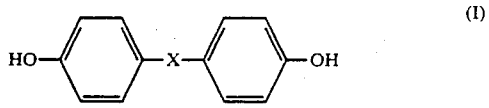

(I)

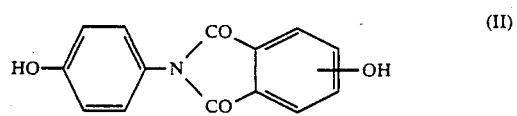

(II)

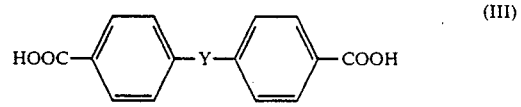

(III)

wherein X is a group selected from among $C_{1-4}$ alkylene, alkylidene, —O—, —SO—, —$SO_2$—, —S— and —CO— and Y is a group selected from among —($CH_2$)$_n$— (n=1 to 4) and —O($CH_2$)$_n$O— (n=1 to 4)

p-substituted benzene compounds such as p-hydroxybenzoic acid, terephthalic acid, hydroquinone, p-aminophenol and p-phenylenediamine; nuclearly substituted derivatives thereof (the substituent may be selected from among chlorine, bromine, methyl, phenyl and 1-phenylethyl groups) and m-substituted benzene derivatives such as isophthalic acid and resorcinol.

The liquid-crystal polyester to be used in the present invention may partially contain polyalkylene terephthalate units not forming any anisotropic molten phase in its molecular chain in addition to the above constituents. In this case, the alkyl group may contain 2 to 4 carbon atoms.

Among the above constituents, it is still preferable that the polyester contain one or more members selected from among naphthalene compounds, biphenyl compounds and p-substituted benzene derivatives. Further, among the p-substituted benzene derivatives, p-hydroxybenzoic acid, methylhydroquinone and 1-phenylethylhydroquinone are particularly preferable.

It is particularly preferable that the anisotropic molten phase-forming polyester contain at least about 10 molar % of repeating units having a naphthalene moiety, such as 6-hydroxy-2-naphthoyl, 2,6-dihydroxynaphthalene or 2,6-dicarboxynaphthalene. Further, it is preferable that the polyester amide to be used in the present invention contain repeating units having a naphthalene moiety as described above and a 4-aminophenol or 1,4-phenylenediamine moiety.

Particular examples of the compounds constituting the polyesters I) to VIII) and preferable examples of the anisotropic molten phase-forming polyester to be used in the present invention are disclosed in Japanese Patent Laid-Open No. 69866/1986 corresponds to U.S. Pat. No. 4,626,371).

The sealing resin composition according to the present invention may contain other thermoplastic resin as an auxiliary resinous component in such an amount as not to mar the object of the present invention.

The thermoplastic resin to be auxiliarily used is not particularly limited and examples thereof include polyolefins such as polyethylene and polypropylene; aromatic polyesters prepared from aromatic dicarboxylic acid and diol or from aromatic hydroxy carboxylic acid such as polyethylene terephthalate and polybutylene terephthalate; polyacetal (homo- or co-polymer), polystyrene, polyvinyl chloride, polyamide, polycarbonate, ABS, polyphenylene oxide, polyphenylene sulfide and fluororesins. Two or more of these thermoplastic resins may be simultaneously used.

The liquid-crystal polyester according to the present invention exhibits high strength owing to the self-reinforcing effect resulting from its special molecular arrangement and has a low coefficient of linear expansion and a low molding shrinkage factor, thus suffering only reduced dimensional distortion. The polyester has also excellent heat resistance to withstand high temperature of 220° C. or above in spite of its low melt viscosity and excellent flow properties. Further, it is excellent in resistance to chemicals, weather and hot water, is chemically stable and does not exert any effect upon other materials, thus being extremely usable as a sealing material According to the present invention, the performance of a low-molecular weight, liquid-crystal polyester can be improved by the addition of an inorganic powder surface-treated with a silane coupling agent, while keeping the characteristics inherent to the polyester.

It is preferable that the silane coupling agent to be used in the sealing resin composition according to the present invention be resistant enough to high temperature of 200° C. or above, still preferably 300° C. or above, so as not to cause the troubles due to a gas generated by the decomposition during extrusion and molding under a high-temperature condition, and do not contain any ion such as $Na^+$, $K^+$, $Ca^{2+}$ or $Cl^-$.

The silane coupling agent to be used in the present invention is represented by the general formula:

$$Q-\underset{(CH_3)_{3-n}}{\overset{|}{Si}}-P_n$$

wherein P is a group which is hydrolyzed in an aqueous solution or with water which is contained in air or adsorbed to the surface of an inorganic substance to form a silanol group and examples thereof include $-OC_2H_4OCH_3$, $-OC_2H_5$ and $-OCH_3$; Q is an organic reactive group which is compatible with the organic polymer and can be bonded to it and n is 1 to 3.

It has been now found that the use of a silane coupling agent represented by the above general formula wherein Q is an epoxy or mercapto group is particularly excellent from the standpoint of improving the flow properties and humidity resistance of the sealing material.

The epoxy-silane coupling agent is represented by the above general formula wherein the organic reactive group Q is an epoxy group and preferred examples thereof include

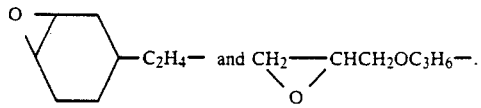

The mercapto-silane coupling agent is represented by the above general formula wherein the organic reactive group Q is a mercapto group and a preferred example thereof is $HSC_3H_6-$.

The amount of the silane coupling agent used is preferably 0.1 to 10% by weight, still preferably 0.5 to 5% by weight, based on the inorganic powder which will be described below Although the inorganic powder to be used in the present invention is not particularly limited as far as it is electrically non-conductive, it is preferred that it exhibit a thermal conductivity of at least 10 W/m·K at 300° K. Examples of the inorganic powder having a high thermal conductivity include oxides, nitrides and carbides of metals and silicon. The metal is selected from among Group II, III and IV elements up to the seventh row of the periodic table. Particular examples thereof include silicon oxide, particularly fused silica, beryllium oxide, magnesium oxide, aluminum oxide, thorium oxide, zinc oxide, silicon nitride, boron nitride, aluminum nitride and silicon carbide. One or more of these powders may be used. Among them, silicon oxide is preferable and fused silica is still preferable.

It is preferable to use a particulate inorganic powder. The mean particle diameter thereof is preferably 1 to 100 μm, still preferably 10 to 70 μm.

According to the present invention, it is preferable that the inorganic powder be preliminarily surface-treated with the epoxy- or mercapto-silane coupling agent as described above and melt-kneaded together with a liquid-crystal polyester It is preferable to use the treated inorganic powder in such an amount as to form a composition having a coefficient of linear expansion equal to that of the electric component to be sealed and as to attain the required thermal conductivity and strength.

The amount is at most 80% by weight, preferably 20 to 75% by weight, still preferably 40 to 75% by weight based on the composition.

The sealing material according to the present invention may further contain silicone for the purpose of reducing the distortion and stress of the resin during molding and curing or use under conditions of rapid temperature changes and improving the adhesion of the material to a substance to be sealed. The silicone includes silicone oils, silicone rubbers and silicone resins These silicone materials essentially consist of polyorganosiloxane. A part of the pendant and/or terminal groups (such as methyl groups) of the dimethylpolysiloxane (major component) may be replaced by one or more members selected from among hydrogen, compounds having an alkyl, aryl, haloalkyl, haloaryl, amino-modified alkyl, mercapto-modified alkyl, epoxy-modified alkyl or carboxyl-modified alkyl group; modified polyethers, modified alcohols and modified esters. These silicone materials may have a crosslinked or grafted structure.

The viscosity of the silicone oil to be used in the present invention is 0.5 to 1,000,000 cSt, preferably 500 to 600,000 cSt. It is particularly preferable to use a silicone oil having a viscosity of 1,000 to 100,000 cSt from the standpoint of attaining excellent workability in extrusion and molding and preventing the bleeding thereof from the molded resin.

The amount of the silicone oil to be added is preferably 0.1 to 5% by weight, still preferably 0.5 to 3% by weight, based on the total amount of the composition.

The silicone rubber to be used in the present invention is preferably particulate one and examples thereof include millable silicone rubbers which are prepared by kneading an organopolysiloxane having a high degree of polymerization together with an inorganic filler and a curing agent and curing the obtained composition under heating and silicone rubbers prepared by cross-linking at least one organopolysiloxane having a reactive group in the presence of a catalyst by heating or irradiation with ultraviolet rays.

It is particularly preferable to use a fine-particulate silicone rubber of an addition type which can be cross-linked by the hydrosilylation addition between an unsaturated group such as a vinyl group and a —Si—H group in the presence of a platinum compound catalyst. The mean particle diameter of the particulate silicon rubber is preferably 0.1 to 100 μm, still preferably 1 to 20 μm.

The amount of the silicone rubber used is preferably 1 to 20% by weight, still preferably 2 to 15% by weight, based on the total amount of the composition.

The silicone resin to be used in the present invention is a polyorganosiloxane having a highly three-dimensional crosslinked structure. Particularly, the use of a finely divided silicone resin is preferable. The mean particle diameter of the resin is preferably 0.1 to 100 μm, still preferably 1 to 20 μm.

The amount of the silicone resin to be added is preferably 1 to 20% by weight based on the total amount of the composition.

The sealing material according to the present invention may further contain conventional additives. Examples of the additive include inorganic fillers other than those described above, dye, pigment, mold release agent, antioxidant, heat stabilizer, impact modifier and hydrolysis stabilizer. The stabilizer is preferably an epoxy resin.

EXAMPLE

The present invention will now be described in more detail by referring to the following Examples, though it is not limited to them.

EXAMPLES 1 TO 3

A liquid-crystal polyester A which will be described below and a surface-treated fused silica (prepared by treating fused silica having a mean particle diameter of 20 μm with an amount given in Table 1 of a silane coupling agent which will be described below) were blended in a ratio given in Table 1 and pelletized with an ordinary extruder at 280° C. according to a conventional method. An IC of DIP type having 14 pins was sealed with the pellet by insert injection molding at a cylinder temperature of 320° C. The sealed article was examined. The results are shown in Table 1.

The methods of the examination are as follows:

Number of broken gold wires of IC

A voltage was applied to a sealed article shown in FIG. 1(a) to determine the rate of breaking of gold wires 3 between a tip 1 and a lead frame 2 (number of samples causing the breaking of gold wires per 100 samples)

Sweep of gold wire of IC

Figure 1B:
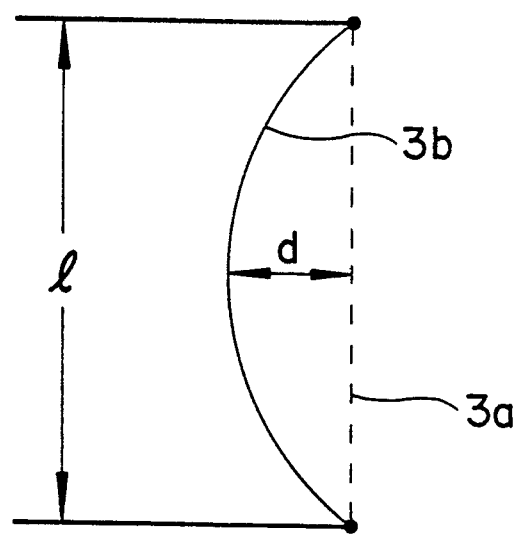

A sealed article was irradiated with soft X-rays to determine the ratio of d to l shown in FIG. 1(b). The average of the ratios thus determined was calculated.

PCT rejection rate

A sealed article was placed in an autoclave of 133° C. and 100% RH for 100 hours to determine the rejection rate of IC (number of rejected samples per 100 examined samples).

Resistance to soldering heat

A sealed article was immersed in a bath of molten solder of 260° C. for 30 seconds and the surface of the resulting article was observed. A case wherein an abnormal change such as blister, rumple, crack or deformation was observed is shown by "X", while a case wherein no abnormal change was observed is shown "◯".

COMPARATIVE EXAMPLES 1 AND 2

The sealing of IC was carried out in a similar manner to the one used in Examples 1 to 3 except that a liquid-crystal polyester B or C which will be described below was used. The results are also shown in Table 1.

COMPARATIVE EXAMPLES 3 TO 6

The sealing of IC was carried out in a similar manner to the one used in Examples 1 to 3 except that no silane coupling agent was used or that a silane coupling agent (4), (5) or (6) which will be described below and is not included in the scope of the present invention was used. The results are shown in Table 1.

EXAMPLES 4 AND 5

The sealing of IC was carried out in a similar manner to the one used in Example 1 except that a fused silica treated with a silane coupling agent (1) was used in an amount of 65 or 75% by weight based on the total amount of the composition. The results are shown in Table 1.

EXAMPLE 6

The sealing of IC was carried out in a similar manner to the one described in Example 1 except that a silane coupling agent (1) was used in an amount of 0.03 part by weight based on the silica used. The results are shown in Table 1.

The liquid-crystal polyesters used in the Examples comprise the following units:

= 70/26/4
weight-average molecular weight: 3500

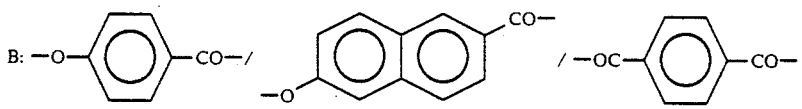

B:

= 70/27.3/2.7
weight-average molecular weight: 5200

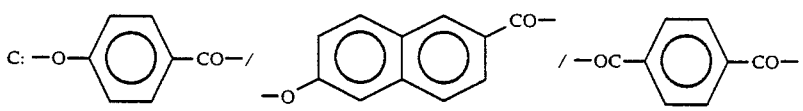

C:

= 70/27.9/2.1
weight-average molecular weight: 6500

The silane coupling agents used have the following structures respectively.

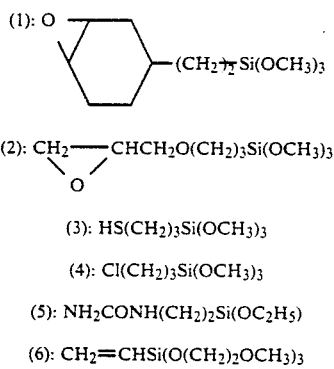

(1): cyclohexane epoxide-(CH$_2$)$_2$Si(OCH$_3$)$_3$ (2): CH$_2$—CHCH$_2$O(CH$_2$)$_3$Si(OCH$_3$)$_3$ (epoxide)

(3): HS(CH$_2$)$_3$Si(OCH$_3$)$_3$ (4): Cl(CH$_2$)$_3$Si(OCH$_3$)$_3$ (5): NH$_2$CONH(CH$_2$)$_2$Si(OC$_2$H$_5$)$_3$ (6): CH$_2$=CHSi(O(CH$_2$)$_2$OCH$_3$)$_3$ seconds in a bath of molten solder provided at 260° C., as evidenced by the absence of visible surface change.

2. A sealing resin composition for an electronic component as set forth in claim 1, wherein the amount of the mercaptosilane coupling agent used is 0.1 to 10 percent by weight based on the weight of the inorganic powder.

3. A sealing resin composition for an electronic component as set forth in claim 1, wherein said inorganic powder exhibits a thermal conductivity of 10 W/m·K at 300° K. and is electrically non-conductive.

4. A sealing resin composition for an electronic component as set forth in claim 2, wherein said inorganic powder exhibits a thermal conductivity of 10 W/m·K at 300° K. and is electrically non-conductive.

5. A sealing resin composition for an electronic component as set forth in claim 1, wherein said inorganic powder is one selected from among the oxides, nitrides and carbides of metals and silicon.

TABLE 1

|  | Ex.1 | Ex.2 | Ex.3 | Ex.4 | Ex.5 | Ex.6 | Comp. Ex.1 | Comp. Ex.2 | Comp. Ex.3 | Comp. Ex.4 | Comp. Ex.5 | Comp. Ex.6 |
|---|---|---|---|---|---|---|---|---|---|---|---|---|
| Resin | A | A | A | A | A | A | C | B | A | A | A | A |
| (% by weight) | 50 | 50 | 50 | 35 | 25 | 50 | 50 | 50 | 50 | 50 | 50 | 50 |
| Silane coupling agent | (1) | (2) | (3) | (1) | (1) | (1) | (1) | (1) | — | (4) | (5) | (6) |
| (per 100 parts by weight of silica) | 0.01 | 0.01 | 0.01 | 0.01 | 0.01 | 0.03 | 0.01 | 0.01 | — | 0.01 | 0.01 | 0.01 |
| Treated silica (% by weight) | 50 | 50 | 50 | 65 | 75 | 50 | 50 | 50 | 50 | 50 | 50 | 50 |
| Number of broken gold wires of IC | 0/100 | 0/100 | 0/100 | 0/100 | 0/100 | 0/100 | 5/100 | 3/100 | 5/100 | 1/100 | 2/100 | 2/100 |
| Sweep of gold wire of IC | 0.0 | 0.0 | 0.0 | 0.1 | 0.1 | 0.0 | 0.2 | 0.2 | 0.3 | 0.0 | 0.1 | 0.1 |
| PCT rejection rate | 0/100 | 0/100 | 0/100 | 0/100 | 0/100 | 0/100 | 0/100 | 0/100 | 0/100 | 4/100 | 0/100 | 0/100 |
| Resistance to solding heat | ○ | ○ | ○ | ○ | ○ | ○ | ○ | ○ | X | X | X | X |

We claim:

1. A sealing composition for an electronic component comprising a melt-processable polyester which has a weight-average molecular weight of 1000 to 3900 and forms an optically anisotropic molten phase, and an effective concentration not to exceed 80 percent by weight based upon the total weight of the composition of an inorganic powder capable of mean particle size diameter 1-1000 uM necessary to increase the thermal conductivity to at least 10 W/m·K at 300° K. of said composition, said inorganic powder having been surface-treated with 0.1-10% mercaptosilane coupling agent based on said inorganic powder, wherein said composition is capable of well protecting an electronic component encapsulated therein when immersed for 30

6. A sealing resin composition for an electronic component as set forth in claim 2, wherein said inorganic powder is one selected from among the oxides, nitrides and carbides of metals and silicon.

7. A sealing resin composition for an electronic component as set forth in claim 3, wherein said inorganic powder is one selected from among the oxides, nitrides and carbides of metals and silicon.

8. A sealing resin composition for an electronic component as set forth in claim 1, wherein said inorganic powder is one selected from among oxides, nitrides and carbides of Group II, III and IV elements up to the seventh row of the periodic table.

9. A sealing resin composition for an electronic component as set forth in claim 2, wherein said inorganic powder is one selected from among oxides, nitrides and carbides of Group II, III and IV elements up to the seventh row of the periodic table.

10. A sealing resin composition for an electronic component as set forth in claim 3, wherein said inorganic powder is one selected from among oxides, nitrides and carbides of Group II, III and IV elements up to the seventh row of the periodic table.

11. A sealing resin composition for an electronic component as set forth in claim 4, wherein said inorganic powder is one selected from among oxides, nitrides and carbides of Group II, III and IV elements up to the seventh row of the periodic table.

12. A sealing resin composition for an electronic component as set forth in claim 1, wherein said inorganic powder is selected from the group consisting of silicon oxide, beryllium oxide, magnesium oxide, aluminum oxide, thorium oxide, zinc oxide, silicon nitride, boron nitride, aluminum nitride, silicon carbide, and mixtures of two or more of these.

13. A sealing resin composition for an electronic component as set forth in claim 2, wherein said inorganic powder is selected from the group consisting of silicon oxide, beryllium oxide, magnesium oxide, aluminum oxide, thorium oxide, zinc oxide, silicon nitride, boron nitride, aluminum nitride, silicon carbide, and mixtures of two or more of these.

14. A sealing resin composition for an electronic component as set forth in claim 3, wherein said inorganic powder is selected from the group consisting of silicon oxide, beryllium oxide, magnesium oxide, aluminum oxide, thorium oxide, zinc oxide, silicon nitride, boron nitride, aluminum nitride, silicon carbide, and mixtures of two or more of these.

15. A sealing resin composition for an electronic component as set forth in claim 4, wherein said inorganic powder is selected from the group consisting of silicon oxide, beryllium oxide, magnesium oxide, aluminum oxide, thorium oxide, zinc oxide, silicon nitride, boron nitride, aluminum nitride, silicon carbide, and mixtures of two or more of these.

16. A sealing resin composition for an electronic component as set forth in claim 5, wherein said inorganic powder is selected from the group consisting of silicon oxide, beryllium oxide, magnesium oxide, aluminum oxide, thorium oxide, zinc oxide, silicon nitride, boron nitride, aluminum nitride, silicon carbide, and mixtures of two or more of these.

17. A sealing resin composition for an electronic component as set forth in claim 12, wherein said silicon oxide is fused silica.

18. A sealing resin composition for an electronic component as set forth in claim 1, wherein said composition further contains an effective amount of silicone to enhance the dimensional stability of the composition during molding.

19. An electronic component which is sealed with a composition as set forth in claim 1.

20. An electronic component which is sealed with a composition as set forth in claim 2.

21. A sealing resin composition for an electronic component as set forth in claim 1, wherein said melt-processable polyester has a weight-average molecular weight of 2000 to 3700.

22. A sealing composition for an electronic component as set forth in claim 1, wherein said inorganic powder is present in a concentration of 20 to 75 percent by weight of the composition.

23. A sealing composition for an electronic component as set forth in claim 1, wherein said inorganic powder is present in a concentration of 40 to 75 percent by weight of the composition.

* * * * *